United States Patent
Shinde et al.

(10) Patent No.: US 11,125,319 B2
(45) Date of Patent: Sep. 21, 2021

(54) LIMITED OIL DISPLACEMENT SYSTEM

(71) Applicant: Deere & Company, Moline, IL (US)

(72) Inventors: Prashant Shinde, Tal. Malshiras. Akluj (IN); Steven R. Fliearman, Coffeyville, KS (US); Isaiah Janzen, Independence, KS (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 16/444,007

(22) Filed: Jun. 18, 2019

(65) Prior Publication Data

US 2020/0400226 A1 Dec. 24, 2020

(51) Int. Cl.
*F16H 57/05* (2006.01)
*F16H 57/04* (2010.01)
*B60K 17/36* (2006.01)

(52) U.S. Cl.
CPC ......... *F16H 57/05* (2013.01); *F16H 57/0402* (2013.01); *F16H 57/0443* (2013.01); *F16H 57/0445* (2013.01); *F16H 57/0457* (2013.01); *B60K 17/36* (2013.01)

(58) Field of Classification Search
CPC ............ F16H 57/0443; F16H 57/0445; F16H 57/0447; F16H 57/0457; F16H 57/05; F16N 19/006; F16N 2270/10
See application file for complete search history.

(56) References Cited

U.S. PATENT DOCUMENTS

| | | | | |
|---|---|---|---|---|
| 2,517,913 | A * | 8/1950 | Nickle | F16H 57/0457 74/467 |
| 3,786,888 | A * | 1/1974 | Nelson | B60K 17/32 180/24.11 |
| 3,915,252 | A * | 10/1975 | Datta | F16N 7/00 180/246 |
| 4,526,054 | A * | 7/1985 | Ehrlinger | F16H 57/0447 184/6.12 |
| 4,736,819 | A * | 4/1988 | Muller | F16H 57/0447 123/196 AB |
| 5,290,201 | A * | 3/1994 | Tesker | B60K 17/105 180/24.11 |
| 8,573,337 | B1 | 11/2013 | Luoma et al. | |
| 2008/0190497 | A1* | 8/2008 | Varda | F15B 1/26 137/574 |
| 2015/0323059 | A1* | 11/2015 | Pritchard | F16H 57/05 184/15.1 |
| 2016/0341301 | A1* | 11/2016 | Slesinski | F16H 57/0457 |
| 2020/0347928 | A1* | 11/2020 | Bauer | F03D 9/25 |

FOREIGN PATENT DOCUMENTS

JP 2009275886 A 11/2009
RU 2600274 C1 10/2016

* cited by examiner

*Primary Examiner* — Minh Truong

(57) ABSTRACT

A limited oil displacement system is positioned within a tandem housing of a tandem of a work vehicle. The tandem includes a tandem oil where a chain assembly is at least partially submerged. The limited oil displacement system may include one or more oil displacement unit used for displacing the tandem oil. The oil displacement unit has an upper portion and a lower portion coupled to and positioned under the upper portion. A volume of the upper portion is larger than a volume of the lower portion such that when the tandem of the work vehicle pivots about a lateral axis, the oil displacement unit displaces the tandem oil more than when the tandem of the work vehicle remains horizontally.

17 Claims, 9 Drawing Sheets

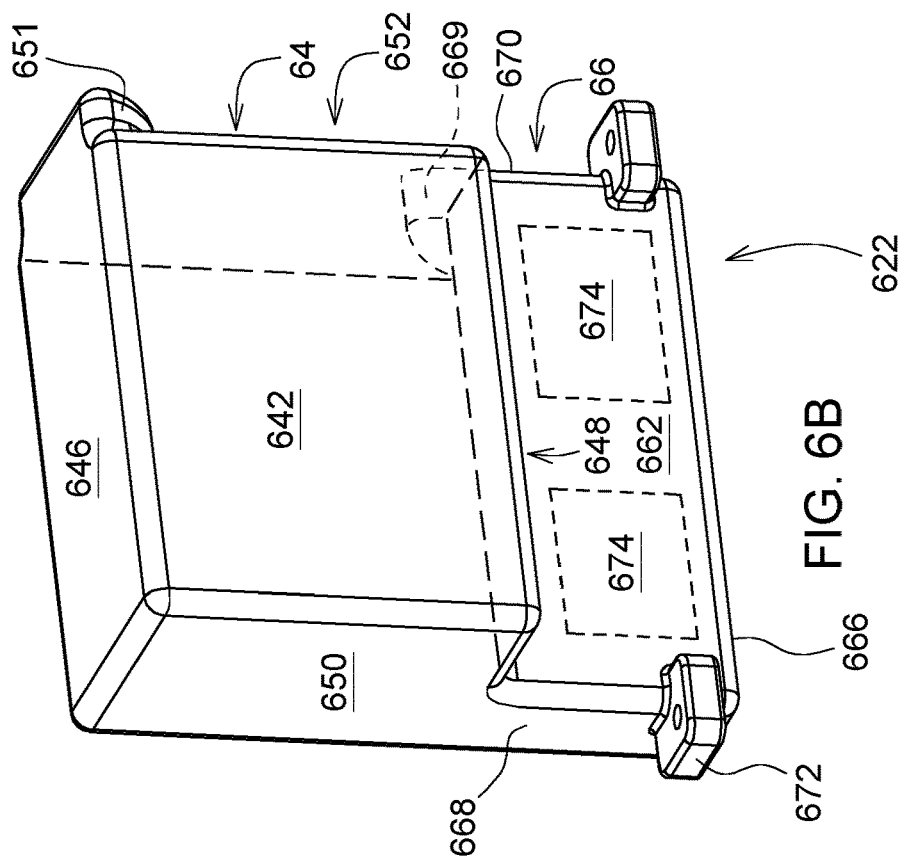
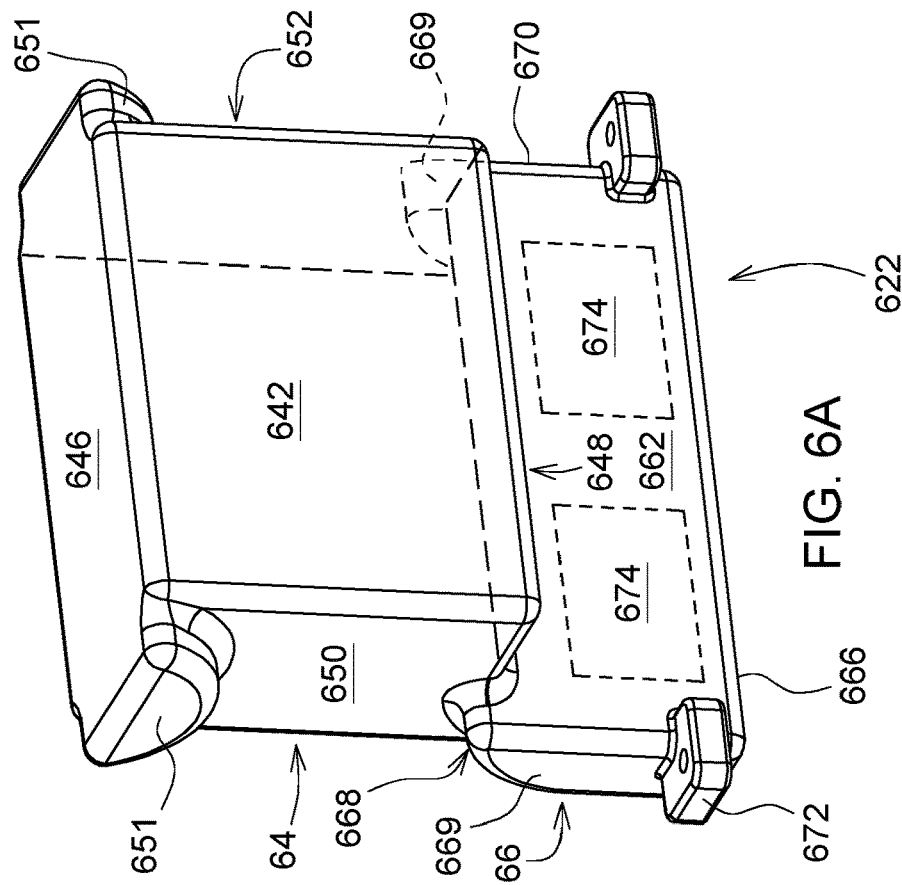

LIMITED OIL DISPLACEMENT SYSTEM

RELATED APPLICATIONS

N/A

FIELD OF THE DISCLOSURE

The present disclosure relates generally to limited oil displacement system which save oil for tandem.

BACKGROUND OF THE DISCLOSURE

A motor grader, a type of work vehicle, typically has a tandem on the laterally opposite sides of the rear section of the motor grader. The tandems are coupled to a rear axle which provides a propulsion input to each tandem. With respect to each tandem, the propulsion input drives, for example, a pair of chains contained within the tandem housing of the tandem. The two chains drive respectively two propulsion outputs which drive respectively two ground-engaging wheels. An oil is filled in the tandem house at recommended level so as to lubricate, for example, the two chains, bearing(s) in each wheel end, bearing(s) and bushing(s) at a pivot joint.

SUMMARY OF THE DISCLOSURE

According to an aspect of the present disclosure, a limited oil displacement system is positioned within a tandem housing of a tandem of a work vehicle. The tandem includes a tandem oil where a chain assembly is at least partially submerged. The limited oil displacement system may include at least one oil displacement unit configured to displace the tandem oil. The at least one oil displacement unit has an upper portion and a lower portion coupled to and positioned under the upper portion. A volume of the upper portion is larger than a volume of the lower portion such that when the tandem of the work vehicle pivots about a lateral axis, the at least one oil displacement unit displaces the tandem oil more than when the tandem of the work vehicle remains horizontally.

According to an aspect of the present disclosure, a tandem of a work vehicle may include a tandem housing, a chain assembly, a tandem oil, and a limited oil displacement system. The tandem housing may include a first wall, a second wall, and exterior rim. The first wall defines a propulsion input aperture configured to receive a propulsion input of the work vehicle. The second wall defines a first propulsion output aperture configured to receive a first propulsion output of the work vehicle and a second propulsion output aperture configured to receive a second propulsion output of the work vehicle. The exterior rim is coupled to the first wall and the second wall and provides a periphery of the tandem housing laterally between the first wall and the second wall. The chain assembly is positioned within the tandem housing and drivingly interconnecting the propulsion input, the first propulsion output, and the second propulsion output. The tandem oil is positioned within the tandem housing. The chain assembly is at least partially submerged in the tandem oil. The limited oil displacement system is positioned within the tandem housing. The limited oil displacement system may include at least one oil displacement unit configured to displace the tandem oil. The at least one oil displacement unit has an upper portion and a lower portion coupled to and positioned under the upper portion. A volume of the upper portion is larger than a volume of the lower portion such that when the tandem of the work vehicle pivots about a tandem axis, the at least one oil displacement unit displaces the tandem oil more than when the tandem of the work vehicle remains horizontally.

Other features and aspects will become apparent by consideration of the detailed description and accompanying drawings.

BRIEF DESCRIPTION OF THE DRAWINGS

The detailed description of the drawings refers to the accompanying figures in which:

FIG. 6A is the first embodiment of the oil displacement unit;

FIG. 6B is the second embodiment of the oil displacement unit;

DETAILED DESCRIPTION OF THE DRAWINGS

Figure 1:
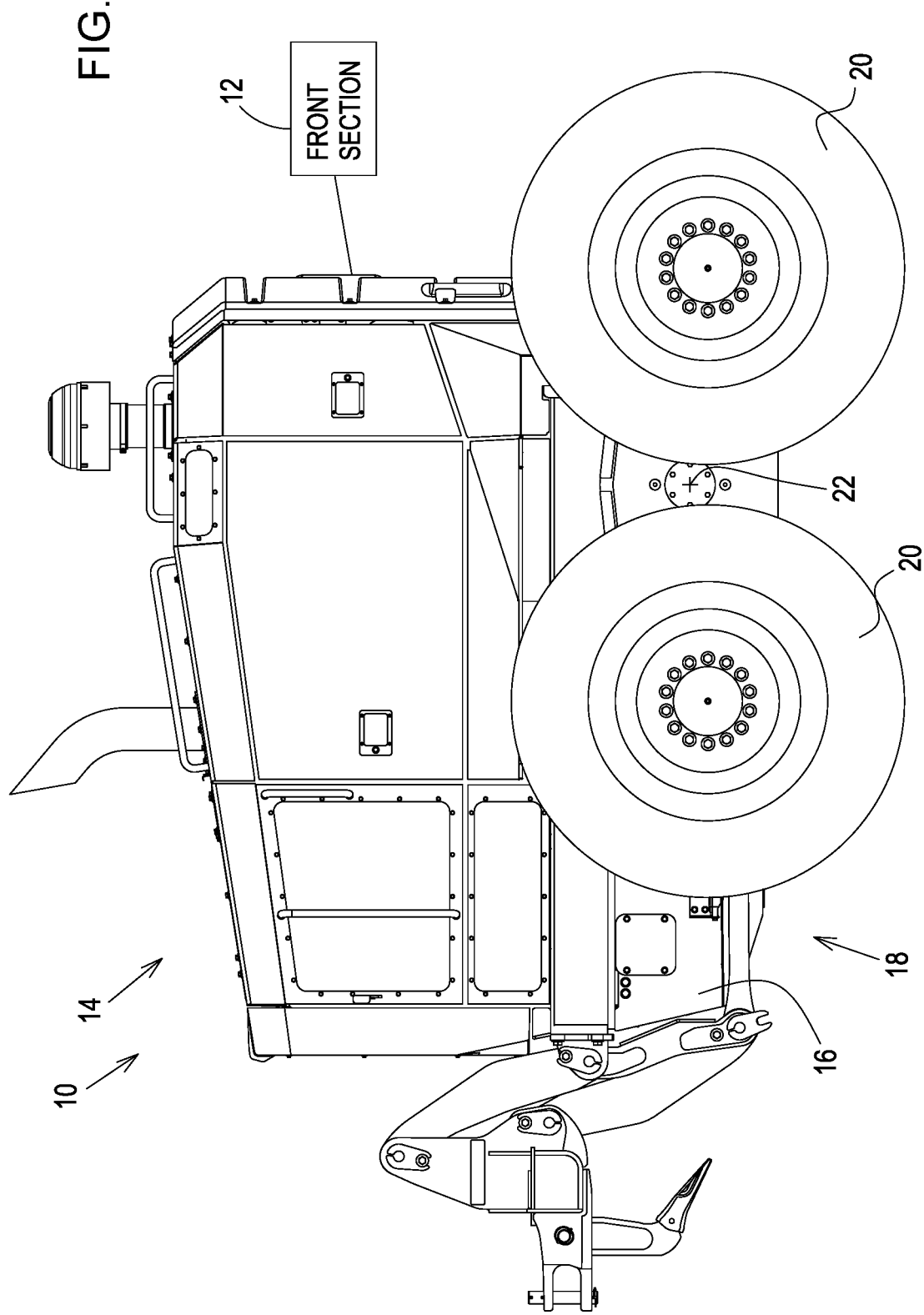
FIG. 1 is a side elevational view showing a motor grader that includes a rear section which has a tandem on each side of the motor grader, the right tandem being shown.

Referring to FIG. 1, a motor grader 10 has a front section 12 and a rear section 14. The front section 12, shown diagrammatically, includes two front wheels, the moldboard, and an operator's station. The rear section 14 includes a frame 16 and two tandems 18 coupled to the frame 16 and positioned on opposite sides of the rear section 14, the right tandem shown, for example, in FIG. 1 and representative of the left tandem. Each tandem 18 has two ground-engaging wheels 20 and is pivotable about a tandem axis 22 between the wheels 20 to adjust to uneven terrain so as to promote traction and minimize vertical motion of the motor grader 10.

Figure 2:
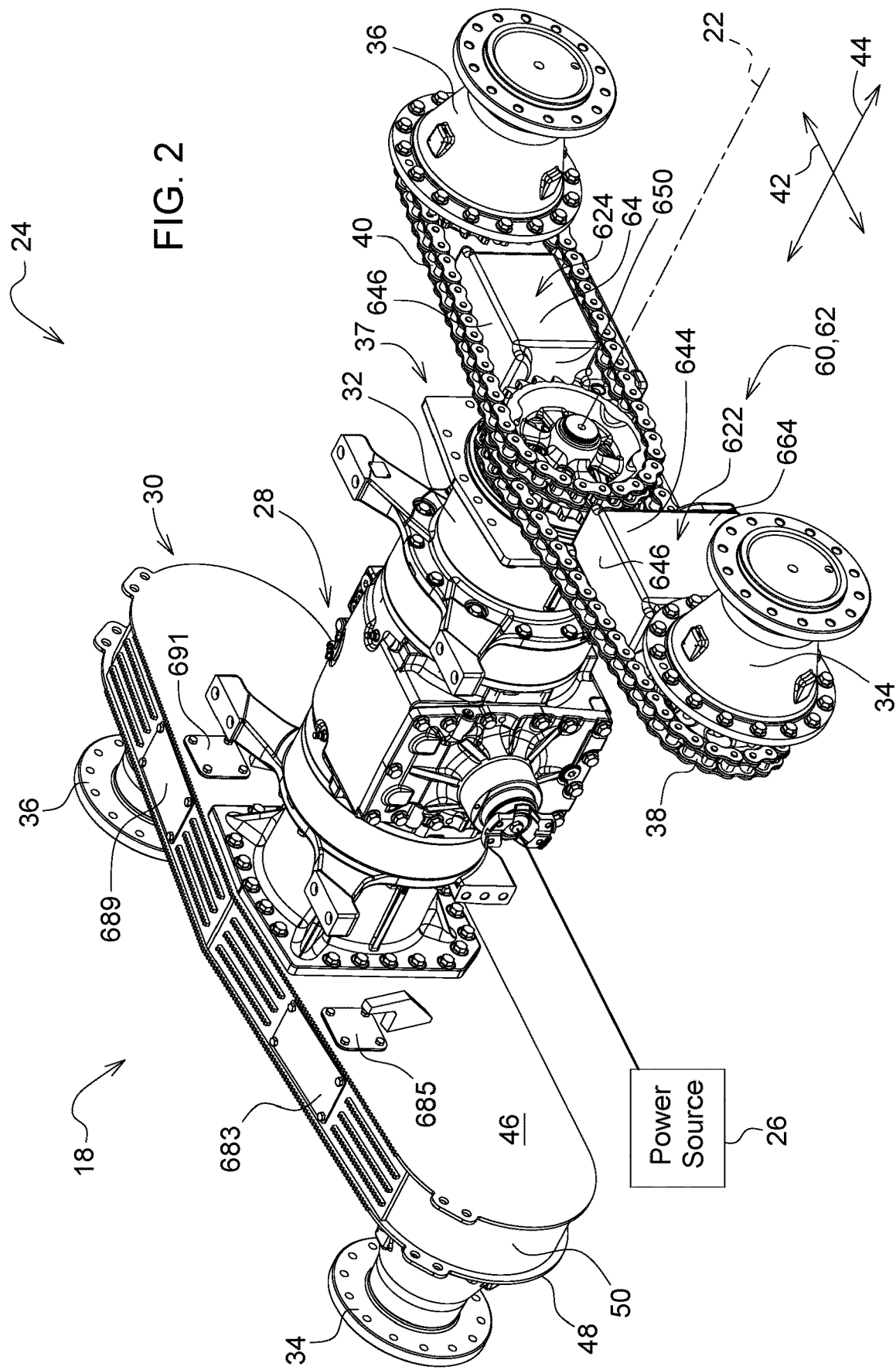
FIG. 2 is a perspective view showing a propulsion system of the motor grader.

Referring to FIG. 2, the motor grader 10 includes a fixed-drive propulsion system 24 for propelling the rear section 14. The propulsion system 24 includes a power source 26, in the form of, for example, an internal combustion engine and a transmission coupled to the engine, and an axle 28 coupled to the power source 26 so as to be driven thereby.

The tandems 18 are included in the propulsion system 24. Each tandem 18 (shown with the wheels 2 in FIG. 2) includes a tandem housing 30, a propulsion input 32 coupled to a respective end of the axle 28 so as to be driven thereby and coupled to the housing 30, a first propulsion output 34 coupled to the housing 30, a second propulsion output 36 coupled to the housing 30, a first chain 38 positioned within the tandem housing 30 and drivingly interconnecting the input 32 and the output 34, a second chain 40 positioned within the housing 30 and drivingly interconnecting the input 32 and the output 36, and a limited oil displacement 60. The first chain 38 and second chain 40 are comprised by a chain assembly 37. The housing 30 of the right tandem 18 is removed in FIG. 2 in order to show interior components of the tandems 18.

The input 32 of a tandem 18 extends into the housing 30, and may be configured in any suitable manner. For example, the input 32 includes a shaft and two sprockets mounted on the shaft so as to rotate therewith about the axis 22.

Each output 34 of a tandem 18 may be configured in any suitable manner. For example, each output 34 includes a shaft drivingly coupled to the chain, and a sprocket mounted on the shaft.

With respect to each tandem 18, the propulsion input 32 is drivingly coupled to the propulsion outputs 34, 36. The first chain 38 is trained about one of the sprockets of the input 32 and the sprocket of the first propulsion output 34. The second chain 40 is trained about the other of the sprockets of the input 32 and the sprocket of the second propulsion output 36.

Figure 3:
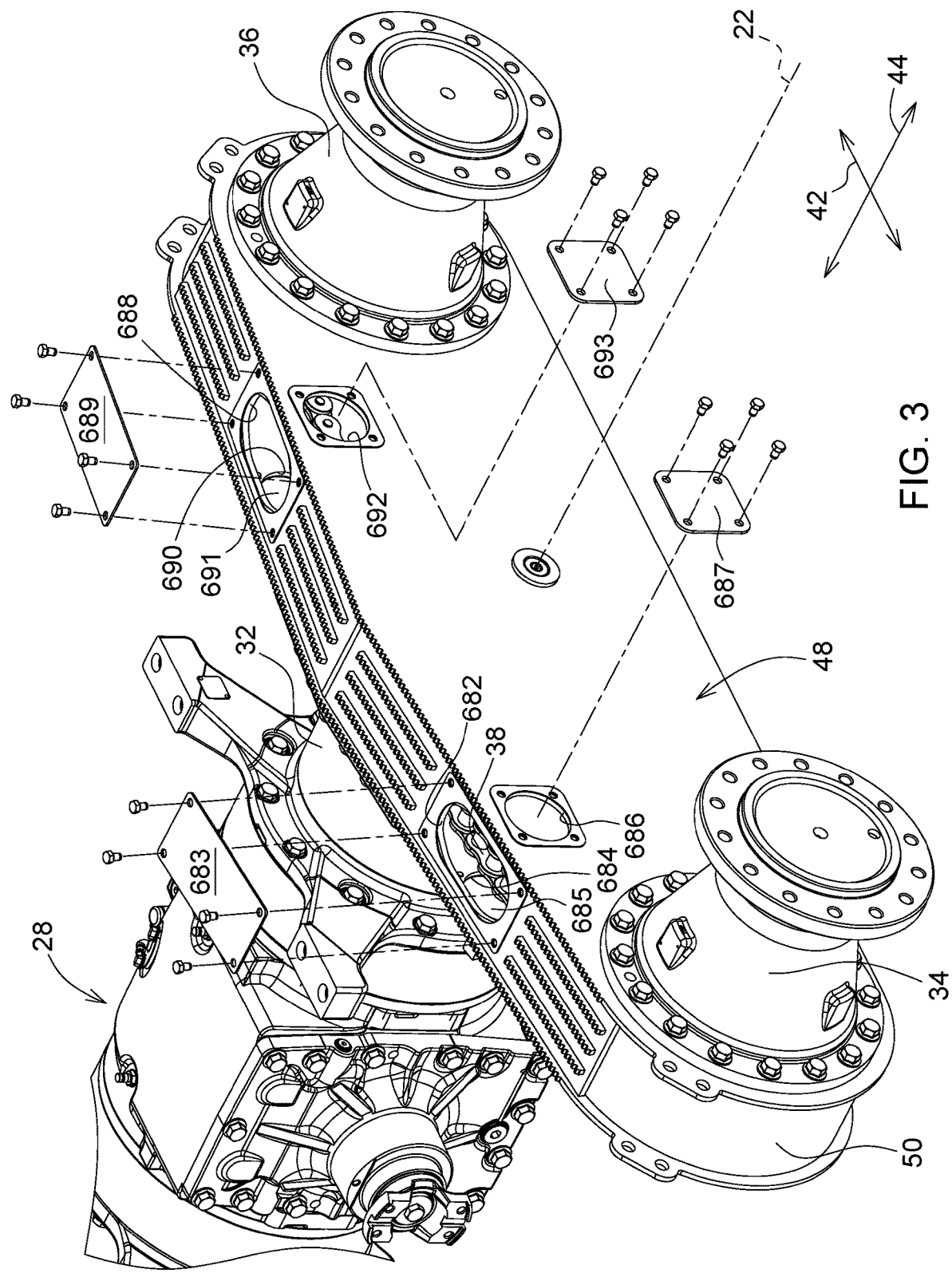
FIG. 3 is a perspective view showing a tandem.
Figure 4:
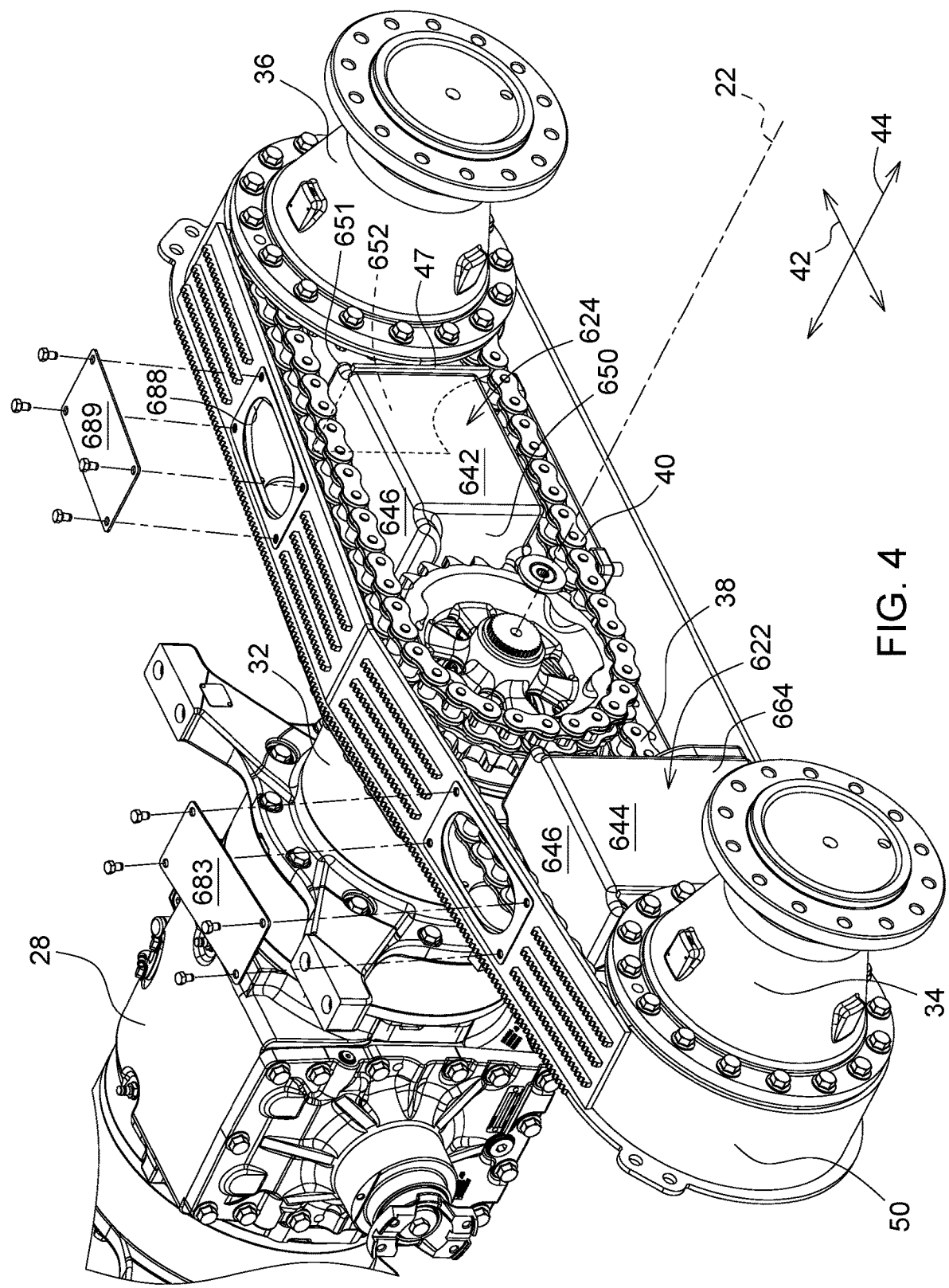
FIG. 4 is a perspective view of FIG. 3, showing a first embodiment of two oil displacement units with a second wall omitted.
Figure 5:
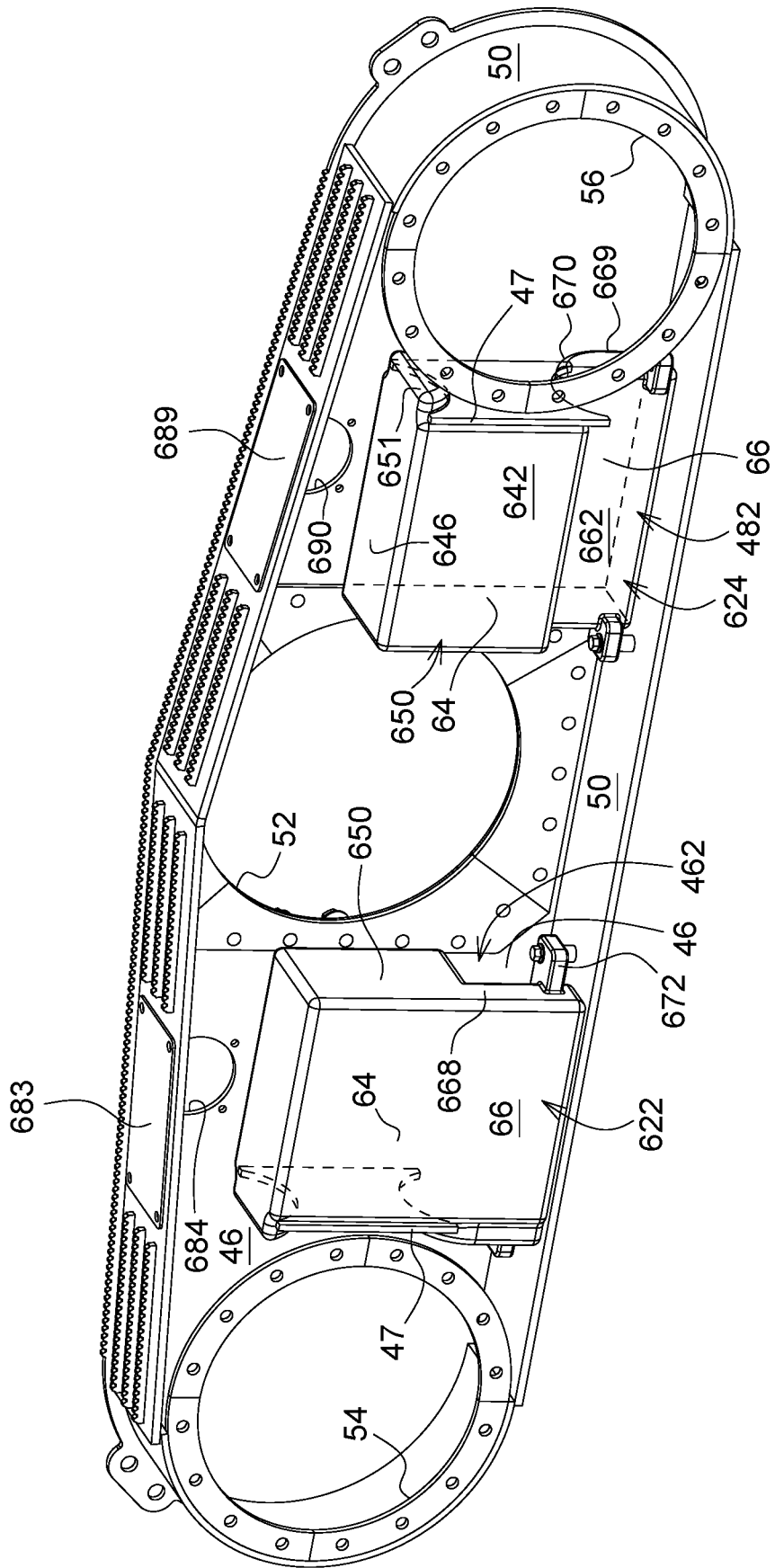
FIG. 5 is a partial perspective view of a tandem housing and a second embodiment of the two oil displacement units.

Referring to FIGS. 3-5, the tandem housing 30 of each tandem 18 the has a fore-aft dimension 42 that corresponds to the fore-aft dimension of the motor grader 10 and a lateral dimension 44 that is perpendicular to the fore-aft dimension 42 and corresponds to the lateral dimension of the motor grader 10. The tandem housing 30 includes a first wall 46, a second wall 48, and an exterior rim 50 coupled to the first wall 46 and the second wall 48 so as to provide a periphery of the tandem housing 30 laterally between the first wall 46 and the second wall 48 relative to the lateral dimension 44 of the tandem housing 30. The second wall 48 is omitted in FIG. 4 in order to show the interior components of the tandems 18. The second wall 48, the chain assembly 37, the propulsion input 32, the first propulsion output 34, and the second propulsion output 36 are omitted in FIG. 5 to demonstrate the limited oil displacement 60 which includes two oil displacement units 62. The first wall 46 includes a propulsion input aperture 52 receiving a propulsion input 32. The washer coupled to the second wall 48 is not removed to show a first propulsion output aperture 54 and a second propulsion output aperture 56. The second wall 48 includes the first propulsion output aperture 54 receiving a first propulsion output 34 and the second propulsion output aperture 56 receiving a second propulsion output 36. The first and second propulsion output apertures 54, 56 are positioned on opposite sides of the propulsion input aperture 52 relative to the fore-aft dimension 42.

Referring to FIGS. 5, 6A and 6B, the limited oil displacement system 60 includes two oil displacement units 62, each of which has an upper portion 64 and a lower portion 66 coupled to and positioned under the upper portion 64. The volume of the upper portion 64 is larger than the volume of the lower portion 66. The two oil displacement units 62 are the first oil displacement unit 622 positioned between the propulsion input 32 and the first propulsion output 34 in the fore-and-aft dimension 42, and a second oil displacement unit 624 positioned between the propulsion input 32 and the second propulsion output 36 in the fore-and-aft dimension 42. For illustration purpose, the first oil displacement unit 622 and the second oil displacement unit 624 are the same and the reference characters of the elements of the first and second oil displacement units 622, 624 are the same. The upper portion 64 of the first oil displacement unit 622 (or the second oil displacement unit 624) includes a front surface 642, a rear surface 644, a top surface 646, a bottom surface 648, and side surfaces 650, 652. The lower portion 66 of the first oil displacement unit 622 (or the second oil displacement unit 624) includes a front surface 662, a rear surface 664, a bottom surface 666, and side surfaces 668, 670. As shown in FIGS. 4, 5, 6A, and 6B, the upper portion 64 and the lower portion 66 of the first oil displacement unit 622 and the first wall 46 form a first channel 462 where the first chain 38 is configured to pass. Specifically, the first channel 462 is formed by the bottom surface 648 of the upper portion 64, the front surface 662 of the lower portion 66, and the first wall 46. Similarly, the upper portion 64 and the lower portion 66 of the second oil displacement unit 624 and the second wall 48 form a second channel 482 where the second chain 40 is configured to pass. Specifically, the second channel 482 is formed by the bottom surface 648 of the upper portion 64, the front surface 662 of the lower portion 66, and the second wall 48.

In this embodiment, in the lateral dimension 44, the first wall 46, the first chain 38, the second chain 40, and the second wall 48 are parallel to one another, and in the lateral dimension 44, the lower portion 66 of the first oil displacement unit 622 is positioned between the second wall 48 and the first chain 38, and the lower portion 66 of the second oil displacement unit 624 is positioned between the second chain 40 and the first wall 46.

The rear surface 664 of the lower portion 66 of the first oil displacement unit 622 and the rear surface 644 of the upper portion 64 of the first oil displacement unit 622 are coplanar. Similarly, the rear surface 664 of the lower portion 66 of the second oil displacement unit 624 and the rear surface 644 of the upper portion 64 of the second oil displacement unit 624 are coplanar. The upper portion 64 of the first oil displacement unit 622 extends from the rear surface 664 of the first oil displacement unit 622 toward the first wall 46 and the upper portion 64 of the second oil displacement unit 624 extends from the rear surface 664 of the second oil displacement unit 624 toward the second wall 48.

Each oil displacement unit 62 may have one or more lugs coupled to one or more alignment plates defined by or protruded from one of the first wall 46 or second wall 48. FIGS. 2, 4, and 6A illustrate the first embodiment of the oil displacement unit 62 where the upper portion 64 includes two first lugs 651 respectively positioned at the side surfaces 650, 652 and the lower portion 66 includes two second lugs 669 respectively positioned at the side surfaces 668, 670. One of the first wall 46 and second wall 48 defines two alignment plates 47 for the oil displacement units 62. For each oil displacement unit 62, the top of the alignment plate 47 is coupled to the first lug 651 of the side surface 652 and the bottom of the same alignment plates 47 is also coupled to the second lug 669 of the side surface 670. Optionally, another two alignment plates (not shown) are defined between the first and second walls 46, 48 and for each oil displacement unit 62, the top of the alignment plate 47 is coupled to the first lug 651 of the side surface 650 and the bottom of the same alignment plates 47 is also coupled to the second lug 669 of the side surface 668. The alignment plates 47 can be used to maintain the positions of the oil displacement units 62.

FIGS. 5, 6B illustrate the second embodiment of the oil displacement unit 62 where each of the oil displacement unit 62 only has one first lug 651 and one second lug 669 that are coupled to the alignment plates 47.

Referring to FIGS. 5, 6A, 6B, each oil displacement unit 62 may include at least one tab 672 that is coupled to the exterior rim 50. In this embodiment the at least one tab 672 is positioned at the lower portion 66 and is fastened through a fastener to the exterior rim 50. The oil displacement unit 62 can also be fastened through other means such as welding (if it is made of metal) or latching. In this regard, the oil displacement unit 62 can be fixed within the tandem without interrupting the chain assembly 37, the propulsion input 32, and the first and second propulsion output 34, 36. Also, if the oil displacement units 62 is made of lighter materials such as plastic and/or is hollow, the configuration mentioned above ensures that the oil displacement amount will not be decreased due to the buoyancy.

Referring to FIGS. 6A and 6B, at least one of the oil displacement unit 62 may include magnets 674 such that the debris in the tandem housing 30 can be collected. The magnets 674 may be positioned inside of the oil displacement units 62 as shown in FIGS. 6A and 6B, or on the outer surfaces of the oil displacement units 62 (not shown). Optionally, the magnets 674 may be positioned on the oil displacement unit 62 adjacent to the channel such as the first channel 462 and second channel 482 through which the chain assembly 37 passes.

Figure 7A:
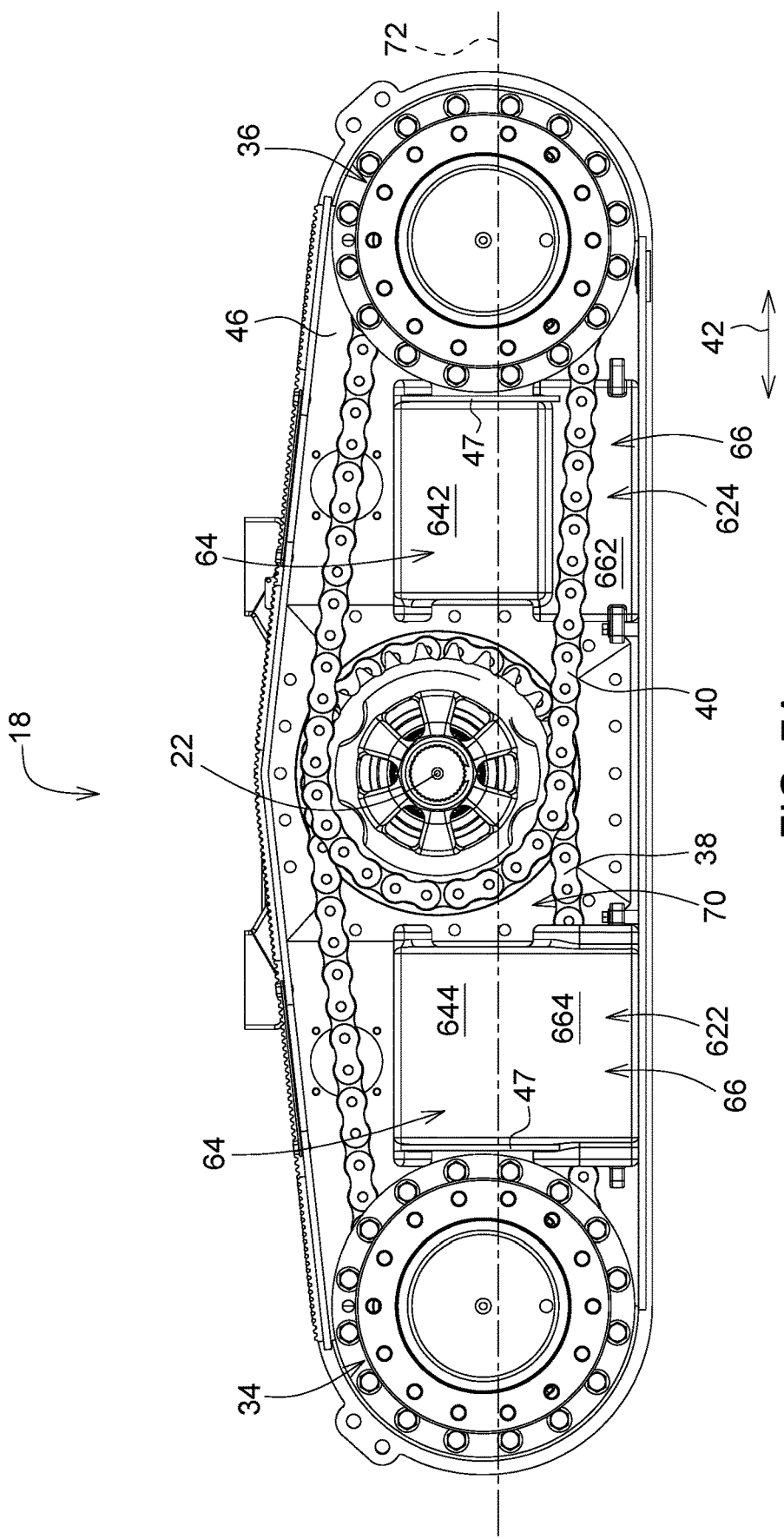
FIG. 7A is a side view of the tandem in FIG. 3 with the second wall omitted, when the tandem is horizontal.
Figure 7B:
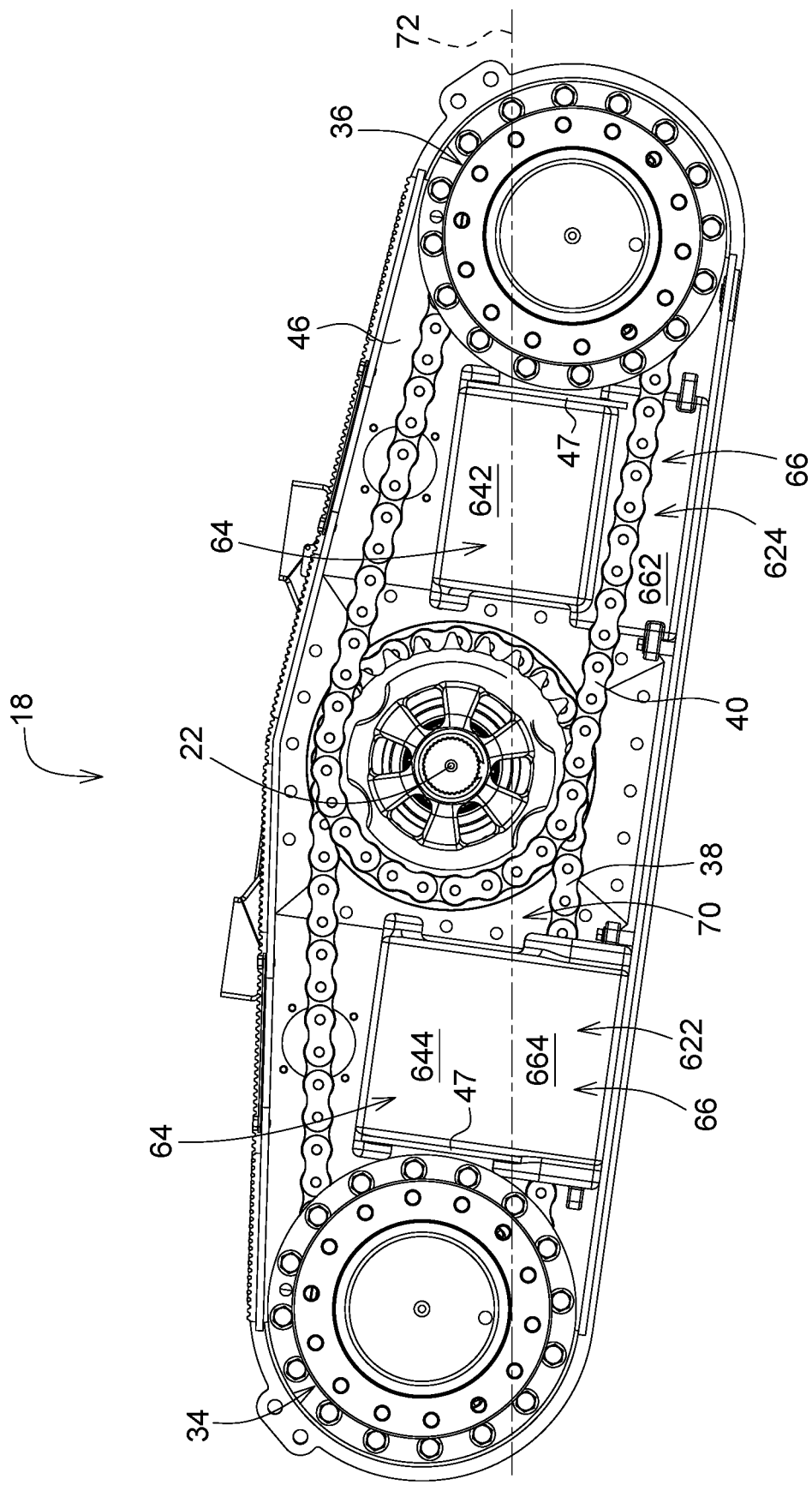
FIG. 7B is a side view of the tandem in FIG. 3 with the second wall omitted, when the tandem pivots about a tandem axis.

As shown in FIGS. 7A and 7B when the tandem 18 is in operation, the tandem 18 includes tandem oil 70. The chain assembly 37, including the first chain 38 and the second chain 40, at least partially submerged in the tandem oil 70. The oil displacement units 62 can be used to displace the tandem oil 70. Because of the oil displacement units 62, the tandem oil level 72 can remain a recommended level with the amount of the tandem oil 70 less than the amount of oil without the oil displacement units 62.

As described previously, each oil displacement unit 62, including the first oil displacement unit 622 and second oil displacement unit 624, has the upper portion 64 and the lower portion 66. The volume of the upper portion 64 is larger than the volume of the lower portion 66. As shown in FIG. 7A, the first oil displacement unit 622 and the second oil displacement unit 624 displace a first amount of tandem oil 70 when the tandem 18 of the motor grader 10 remains horizontally.

As shown in FIG. 7B, when the tandem 18 of the motor grader 10 pivots about an axis in the lateral dimension 44, for example, the tandem axis 22, the first oil displacement unit 622 and the second oil displacement 624 displaces a second amount of the tandem oil 70 more than the first amount in FIG. 7A when the tandem 18 of the motor grader 10 remains horizontally. Even though the first oil displacement unit 622 displaces the tandem oil 70 less than it does when the tandem 18 remains horizontally, the second oil displacement unit 624 displaces the tandem oil 70 much more than it does when the tandem 18 remains horizontally, and therefore the total amount of the oil displacement (second amount) is more than the first amount. In this regard, the tandem oil level 72 will not drop too much due to the pivotal of the tandem 18.

Figure 8:
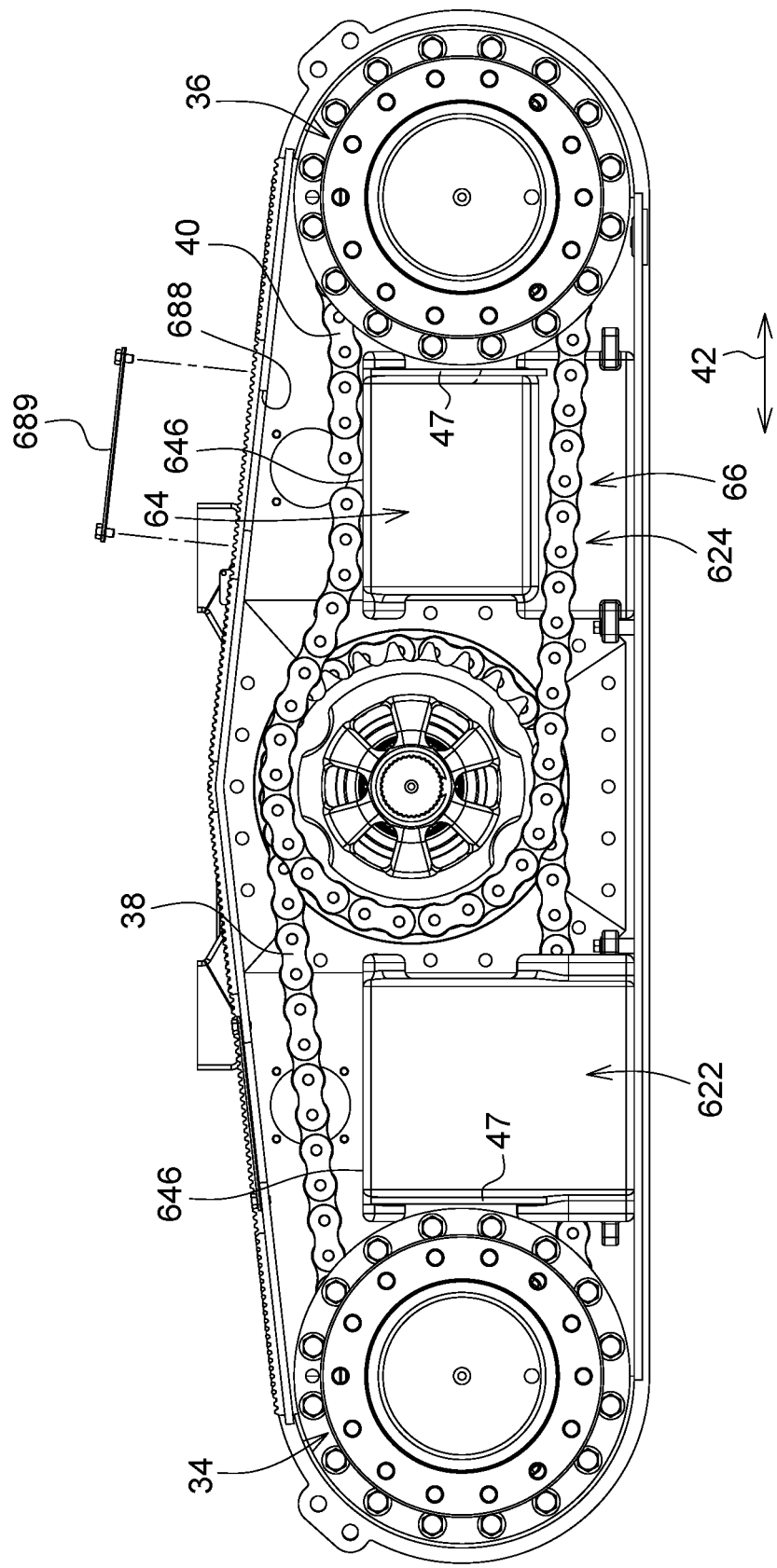
FIG. 8 is a side view of the tandem in FIG. 3 with the second wall omitted, an unassembled chain assembly is rested on the oil displacement unit.

Referring to FIGS. 3, 4, 8, top surface of the exterior rim 50 defines a first chain assembly aperture 682 between the propulsion input 32 and the first propulsion outputs 34 in the fore-and-aft dimension 42. The first wall 46 defines a first chain assembly aperture 684 and the second wall 48 defines a first chain assembly aperture 686. The first oil displacement unit 622 is positioned corresponding to the first chain assembly aperture 682, 684, 686 in the fore-and-aft dimension 42. Similarly, the top surface of the exterior rim 50 also defines a second chain assembly aperture 688 between the propulsion input 32 and the second propulsion outputs 36 in the fore-and-aft dimension 42. The first wall 46 also defines a second chain assembly aperture 690 and the second wall 48 also defines a second chain assembly aperture 692. The second oil displacement unit 624 is positioned corresponding to the second chain assembly apertures 688, 690, 692 in the fore-and-aft dimension 42. The first chain assembly apertures 682, 684, 686 can be used to assemble and observe the first chain 38 in the assembling process. A tool or fingers of an assembler can insert into the tandem housing 30 through one of the first chain assembly apertures 682, 684, 686 to assemble the first chain 38 applying on the propulsion input 32 and the first propulsion output 34. Likewise, the second chain assembly apertures 688, 690, 692 can be used to assemble the second chain 40 applying on the propulsion input 32 and the second propulsion output 36. Covers 683, 685, 687 are used to cover the first chain assembly apertures 682, 684, 686. Covers 689, 691, 693 are used to cover the second chain assembly apertures 688, 690, 692.

The oil displacement units 62 of the limited oil displacement system 60 can help the assembler when the chain assembly 37 is assembled. For example, referring to FIG. 8, two ends of the second chain 40 of the chain assembly 37 can be rested on the top surface 646 of the second oil displacement unit 624. In this regard, the two ends of the second chain 40 will not fall into the lower part of the tandem housing 30 and the assembler can conveniently couple the two ends of the second chain 40.

Without in any way limiting the scope, interpretation, or application of the claims appearing below, a technical effect of one or more of the example embodiments disclosed herein is to displace tandem oil within the tandem housing to maintain recommended level of tandem oil with less tandem oil. Another technical effect of one or more of the example embodiments disclosed herein is even if the tandem pivots, the tandem oil will not drop drastically. Another technical effect of one or more of the example embodiments disclosed herein is to allow the assembler or user to conveniently assemble the chain assembly.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A tandem of a work vehicle, comprising:
   a tandem housing comprising:
      a first wall defining a propulsion input aperture configured to receive a propulsion input of the work vehicle;
      a second wall defining a first propulsion output aperture configured to receive a first propulsion output of the work vehicle and a second propulsion output aperture configured to receive a second propulsion output of the work vehicle;
      an exterior rim coupled to the first wall and the second wall providing a periphery of the tandem housing laterally between the first wall and the second wall;
   a chain assembly positioned within the tandem housing and drivingly interconnecting the propulsion input, the first propulsion output, and the second propulsion output;
   a tandem oil positioned within the tandem housing, the chain assembly at least partially submerged in the tandem oil;
   a limited oil displacement system positioned within the tandem housing, comprising:
      at least one oil displacement unit configured to displace the tandem oil, the at least one oil displacement unit having an upper portion and a lower portion coupled to and positioned under the upper portion, a volume of the upper portion being larger than a volume of the lower portion such that when the tandem of the work vehicle pivots about a tandem axis, the at least one oil displacement unit displaces the tandem oil more than when the tandem of the work vehicle remains horizontally;

wherein the upper portion and the lower portion of the at least one oil displacement unit and one of the first and second walls form a channel where the chain assembly is configured to pass.

2. The tandem of the work vehicle of claim 1, wherein the upper portion of the at least one oil displacement unit includes a bottom surface, and the lower portion includes a front surface, and the channel is formed by the bottom surface of the upper portion, the front surface of the lower portion, and one of the first and second walls.

3. The tandem of the work vehicle of claim 1, wherein the at least one oil displacement unit includes a first lug positioned at a side of the upper portion, and one of the first wall and second wall defines an alignment plate, and a top of the alignment plate is coupled to the first lug.

4. The tandem of the work vehicle of claim 3, wherein the at least one oil displacement unit includes a second lug positioned at a side of the lower portion, and a bottom of the alignment plate is coupled to the second lug.

5. The tandem of the work vehicle of claim 1, wherein the lower portion defines a tab configured to be fastened on the tandem housing.

6. The tandem of the work vehicle of claim 1, wherein a top surface of the exterior rim defines a first chain assembly aperture between the propulsion input and one of the first and second propulsion outputs in a fore-and-aft dimension, and the at least one oil displacement unit is positioned corresponding to the first chain assembly aperture in the fore-and-aft dimension such that when the chain assembly is assembled, two ends of a chain of the chain assembly can be rested on a top surface of the at least one oil displacement unit.

7. The tandem of the work vehicle of claim 6, wherein adjacent to the top surface of the exterior rim, the second wall defines a second chain assembly aperture, and the at least one oil displacement unit is positioned corresponding to the second chain assembly aperture in the fore-and-aft dimension.

8. The tandem of the work vehicle of claim 1, comprising a magnet coupled to the at least one oil displacement unit and configured to collect a debris.

9. The tandem of the work vehicle of claim 1, wherein the at least one oil displacement unit comprises two oil displacement units, when the tandem of the work vehicle pivots about the tandem axis, the two oil displacement units displace the tandem oil more than when the tandem of the work vehicle remains horizontally.

10. The tandem of the work vehicle of claim 1, wherein the chain assembly comprises a first chain positioned within the tandem housing and drivingly interconnecting the propulsion input and the first propulsion output, and a second chain positioned within the tandem housing parallel, in a lateral dimension, to the first chain and drivingly interconnecting the propulsion input and the second propulsion output, and the at least one oil displacement unit comprises a first oil displacement unit positioned between the propulsion input and the first propulsion output in a fore-and-aft dimension, and a second oil displacement unit positioned between the propulsion input and the second propulsion output in the fore-and-aft dimension.

11. The tandem of the work vehicle of claim 10, wherein in the lateral dimension, the first wall, the first chain, the second chain, and the second wall are parallel to one another, and in the lateral dimension, the lower portion of the first oil displacement unit is positioned between the second wall and the first chain, and the lower portion of the second oil displacement unit is positioned between the second chain and the first wall.

12. The tandem of the work vehicle of claim 11, wherein a lower part of the first chain passes under a bottom surface of the upper portion of the first oil displacement unit, and a lower part of the second chain passes under a bottom surface of the upper portion of the second oil displacement unit.

13. The tandem of the work vehicle of claim 12, wherein a rear surface of the lower portion of the first oil displacement unit and a rear surface of the upper portion of the first oil displacement unit are coplanar, a rear surface of the lower portion of the second oil displacement unit and a rear surface of the upper portion of the second oil displacement unit are coplanar, and the upper portion of the first oil displacement unit extends from the rear surface of the first oil displacement unit toward the first wall and the upper portion of the second oil displacement unit extends from the rear surface of the second displacement unit toward the second wall.

14. A limited oil displacement system positioned within a tandem housing of a tandem of a work vehicle, the tandem includes a tandem oil where a chain assembly is at least partially submerged, the limited oil displacement system comprising:

at least one oil displacement unit configured to displace the tandem oil, the at least one oil displacement unit having an upper portion and a lower portion coupled to and positioned under the upper portion, a volume of the upper portion being larger than a volume of the lower portion such that when the tandem of the work vehicle pivots about a lateral axis, the at least one oil displacement unit displaces the tandem oil more than when the tandem of the work vehicle remains horizontally;

wherein the upper portion and the lower portion of the at least one oil displacement unit and a wall of the tandem housing form a channel where the chain assembly is configured to pass.

15. The limited oil displacement system of claim 14, wherein the at least one oil displacement unit includes a first lug positioned at a side of the upper portion and configured to engage with a plate protruding from the tandem housing.

16. The limited oil displacement system of claim 15, wherein the at least one oil displacement unit is coupled to a bottom surface of the tandem housing.

17. The limited oil displacement system of claim 14, wherein the at least one oil displacement unit includes two displacement units departing from each other in a fore-and-aft dimension and facing opposite in a lateral dimension.

* * * * *